UNITED STATES PATENT OFFICE.

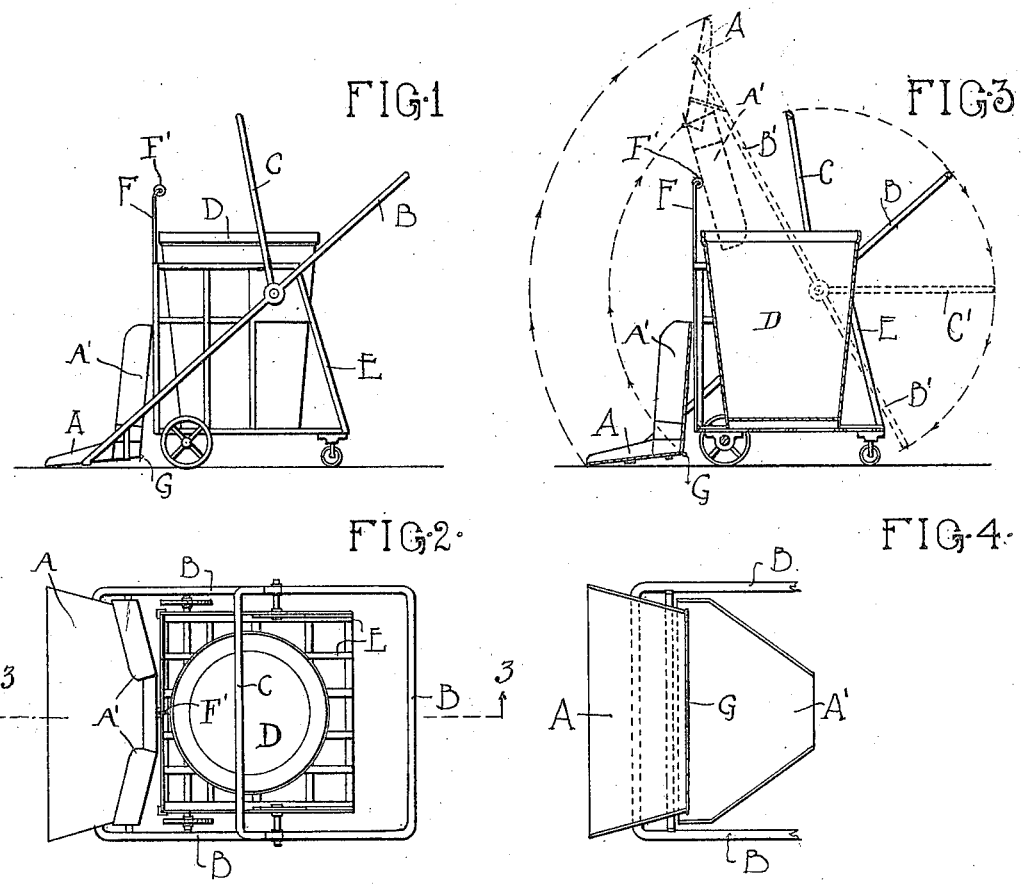

PETER JAY HERTER, OF NEW YORK, N. Y., ASSIGNOR OF ONE-HALF TO MORRIS LIVINGSTON JACOBS, OF NEW YORK, N. Y.

STREET-CLEANER.

1,236,170.   Specification of Letters Patent.   Patented Aug. 7, 1917.

Application filed October 22, 1915. Serial No. 57,300.

*To all whom it may concern:*

Be it known that I, PETER JAY HERTER, a citizen of the United States, and a resident of the city of New York, borough of the Bronx, in the county of Bronx and State of New York, have invented a new and Improved Street-Cleaner, of which the following is a full, clear, and exact description.

The object of the invention is to provide a new and improved street cleaner arranged to readily scoop up the refuse and deposit the same in a receptacle removably carried along on the machine.

In order to accomplish the desired result, use is made of a hand truck provided with a platform for supporting a refuse-receiving receptacle, a guide on the truck and extending above the top of the receptacle, a shovel having a hinged back normally resting on the said guide and adapted to travel up the same and pass over the top of the guide at the time the shovel is swung into uppermost dumping position, the back then forming a chute for delivering the refuse to the receptacle, and a manually operated lever mounted to swing on the said truck and on which the shovel is secured.

A practical embodiment of the invention is represented in the accompanying drawings forming a part of this specification, in which similar characters of reference indicate corresponding parts in all the views.

Figure 1 is a side elevation of the street cleaner;

Fig. 2 is a plan view of the same;

Fig. 3 is a sectional side elevation of the same on the line 3—3 of Fig. 2; and

Fig. 4 is a plan view of a portion of the lever, the shovel and its back extended in the plane of the shovel.

A suitably constructed wheel truck E is adapted to removably support a refuse-receiving receptacle D, and on the sides of the truck is fulcrumed a hand lever B projecting with its forward end beyond the front end of the truck E. On the front end of the lever B is secured a shovel A adapted to scoop up the refuse in the street on pushing the wheel truck forward, it being understood that the operator in manipulating the street cleaner takes hold of the rear end of the lever B and pushes in a forward direction so that the truck E travels over the street surface with the front end of the shovel A in contact with the street surface to scoop up the refuse.

On the rear end of the shovel A is hinged a shovel back A′ by the use of a hinge G, and this shovel back A′ has converging sides provided with upturned flanges to form a chute over which the refuse passes into the receptacle D at the time the shovel A is in uppermost dumping position, as indicated in dotted lines in Fig. 3.

When the shovel A is in lowermost position as shown in the drawings then the shovel back A′ is slightly inclined rearwardly and upwardly, and its free end rests against a guide F arranged vertically on the front end of the truck E. The upper end of the guide F is provided with a roller F′ located a distance above the open top of the receptacle D.

When the truck is pushed forward with the shovel A in scooping up position then the refuse passes onto the shovel A and when the latter is filled the forward movement of the truck is stopped and the operator now bears down on the rear end of the lever B to impart a swinging motion to the said lever with a view to swing the shovel A upward into dumping position, as indicated in Fig. 3. During this upward swinging movement of the shovel A the hinged back A′ travels up the guideway G and finally passes over the roller F′ to assume a rearward and downwardly inclined position at the time the shovel A moves into uppermost dumping position. When this position is reached, the refuse in the shovel A readily slides down the same and onto the back A′, and as the latter now forms a chute it delivers the refuse into the receptacle D without danger of spilling any of the refuse owing to the flanges at the tapering sides of the back A′.

The lever B is preferably provided with an auxiliary handle C extending from the fulcrum of the lever B at an angle to the rear end of the lever B to enable the operator to readily impart a swinging motion to the lever B without requiring the operator to stoop down. After the refuse has been deposited in the receptacle D the lever B with the shovel A and its back A′ are returned to normal position and the above described operation is repeated.

Having thus described my invention, I claim as new and desire to secure by Letters Patent:—

1. A street cleaner, comprising a truck having a support adapted to support a refuse-receiving receptacle, an upright guide on the front end of the truck and extending a distance above the top of the said receptacle, a hand lever fulcrumed on the said truck, and a shovel attached to the forward end of the said lever and provided with a hinged back normally extending upwardly and resting against the said guide, the said shovel back traveling up the said guide on swinging the shovel upward into dumping position, the said shovel back finally passing over the top of the said guide to form a chute for conducting the refuse from the shovel into the said receptacle.

2. A street cleaner, comprising a truck having a support adapted to support a refuse-receiving receptacle, an upright guide on the front end of the truck and extending a distance above the top of the said receptacle, a hand lever fulcrumed on the said truck, and a shovel attached to the forward end of the said lever and provided with a hinged back having converging sides provided with flanges, the said back being inclined rearwardly and upwardly and resting with its upper end against the said guide at the time the shovel is in lowermost scooping up position, the said shovel back traveling up the said guide on swinging the shovel upward into dumping position, the said shovel back passing over the top of the said guide to form a downwardly and rearwardly extending chute for conducting the refuse from the shovel into the said receptacle.

3. A street cleaner, comprising a truck having a support adapted to support a refuse-receiving receptacle, a vertical guide on the front end of the truck and extending a distance above the top of the said receptacle, a hand lever fulcrumed on the said truck and having a forwardly extending shovel-supporting member, a rearwardly extending main handle and an auxiliary handle, and a shovel attached to the said shovel-supporting member and provided with a hinged back normally extending upwardly and resting on the said guide, the said shovel back traveling up the said guide on swinging the shovel upward into dumping position, the shovel back finally passing over the top of the said guide to form a downwardly and rearwardly extending chute for conducting the refuse from the shovel into the said receptacle.

PETER JAY HERTER.

Witnesses:
J. IRVING BREWER,
RUDOLPH EVERS.

Copies of this patent may be obtained for five cents each, by addressing the "Commissioner of Patents, Washington, D. C."